UNITED STATES PATENT OFFICE.

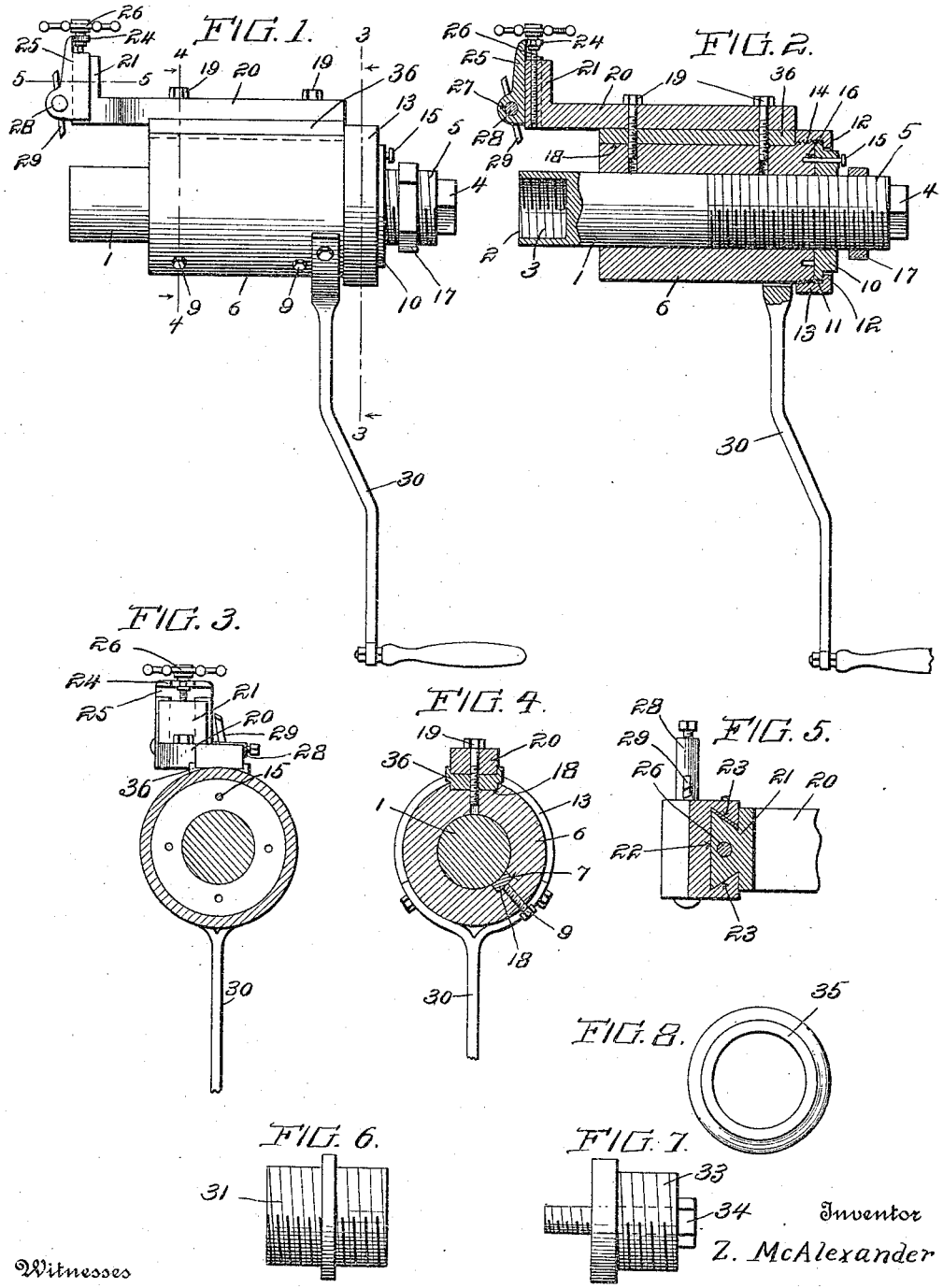

ZACRY McALEXANDER, OF COLLINS, MISSISSIPPI.

LATHE.

1,184,548.  Specification of Letters Patent.  Patented May 23, 1916.

Application filed August 31, 1915. Serial No. 48,283.

*To all whom it may concern:*

Be it known that I, ZACRY McALEXANDER, a citizen of the United States, residing at Collins, in the county of Covington and State of Mississippi, have invented new and useful Improvements in Lathes, of which the following is a specification.

The invention relates to a pin lathe for turning locomotive or stationary pins, being directed to a portable structure which may be readily connected to the pin and which may be operated to turn the pin to the desired extent.

The improved pin lathe is constructed with a view to permitting its ready assemblage and operation in conjunction with pins of the locomotive or stationary engines, and other purposes, the feed of the tool being automatic and the parts capable of adjustment to limit the feed at any desired point in order that shoulders or offsets on the engine pin may be properly turned down.

The invention in the preferred form of details will be described in the following specification, reference being had particularly to the accompanying drawings, in which:

Figure 1 is a view in elevation of the improved lathe; Fig. 2 is a longitudinal central section of the same; Figs. 3, 4 and 5 are transverse sections on lines 3—3, 4—4, and 5—5, respectively, of Fig. 1; Figs. 6 and 7 show a view in elevation of each of two types of bushings used with the lathe. Fig. 8, represents a collar designed to be applied to the main pin of a locomotive.

The improved pin lathe comprises a spindle 1 formed at one end with a short bore 2 interiorly threaded at 3 for connection with the work to be operated upon, as will later appear. The opposite end of the spindle has an angular projection 4 for the application of the spindle to the work. The spindle is exteriorly threaded at 5 for a portion of its length from the free end, the main body 6 in the form of a sleeve like member is arranged to loosely encircle the spindle. The wall of the main body is formed with a longitudinally extending recess 7 opening through the inner side of the wall in which is seated a block 8 operated through the medium of a screw 9 threaded through the body and extending beyond the outer surface thereof, the block 8 acting as a take up for the main body of the spindle in the event of wear.

Threaded upon the opposite portion of the spindle is a feed nut 10 having an annular offset 11 to be engaged by the annular inwardly extending ledge 12 of the holding nut 13 having threaded connection at 14 with the body. A feed pin 15 is operative through the feed nut, and adapted to seat in a recess 16 in the end of the body whereby the feed nut and body may be locked together for simultaneous rotation, or freed from such connection when desired. A jam-nut 17 is also arranged upon the threaded portion 5 of the spindle for a purpose which will later appear. The body is formed with a longitudinally extending channel 18 in which through the medium of screw 19 is set a cutter head post 20. The post 20 has a head 21 to slidably receive a cutter head 25, the connection being through the medium of a projection 22 formed on the head 21 and having undercut walls and a coöperating slot 23 formed in the cutter head. The cutter head 25 is formed with an overhang 24 above the slotted portion, the post head and cutter head being adjustably connected by a screw 26 threaded through the overhang and into the projection 22. The cutter head projects beyond the post head and is formed with a transverse opening 27 in which through any suitable appropriate construction is arranged a tool post 28 for supporting the appropriate tool 29. Secured upon the body is an operating handle 30 whereby the body may be rotated.

31 represents a double end bushing by which the spindle which may be secured to the pin of a locomotive and securely held thereon to permit proper operation of the lathe.

33 represents a different type of bushing, including a cap screw 34, used in securing the spindle to stationary engines or any short bearing.

35 represents a thick collar designed to be applied to the main pin of a locomotive for the machine to screw up against, while 36 represents a channeled plate designed to be applied between the cutter head post and the body to space the post from the spindle to the desired extent to accommodate different size pins to be operated upon.

From the above description it is apparent that with the parts constructed and arranged as described the rotation of the body by means of the handle 30 will drive the tool with obvious effect upon the work, the said nut imparting the necessary longitudinal movement or feed to the body and tool. In the event a shoulder or recess is found in the work being operated on, it is desirable to rotate the tool in one position, that is to say without longitudinal movement, the pin 15 is disconnected from the body and the jamb nut screwed on to prevent the said nut advancing. The body may be now rotated without the advance movement and the cutter head moved as desired radially of the body to cause the tool to ride up and down the surface to be operated upon.

It is apparent that the improved pin lathe may be used in a great variety of situations and while primarily designed as a portable lathe for operating upon locomotives and stationary engine pins it is to be understood that any and all uses are contemplated within the scope of the invention.

What is claimed as new is:

A pin lathe including a spindle threaded for a portion of its length, a body having a smooth bore mounted for free rotary movement on the spindle, a feed nut having threaded coöperation with the spindle and bearing against one end of the body, means for locking the said nut on the body, a channel plate resting upon the body, a cutter head post slidably mounted in the channel plate and removably secured to said plate and body, and an operating handle secured directly to the body.

In testimony whereof I affix my signature in presence of two witnesses.

ZACRY McALEXANDER.

Witnesses:
J. M. Russ,
J. Wiley Thames.

Copies of this patent may be obtained for five cents each, by addressing the "Commissioner of Patents, Washington, D. C."